United States Patent
Ganireddy et al.

(10) Patent No.: US 10,823,147 B2
(45) Date of Patent: Nov. 3, 2020

(54) WIND FARM TOPOLOGY AND METHOD OF OPERATING THE SAME

(71) Applicant: General Electric Company, Schenectady, NY (US)

(72) Inventors: Govardhan Ganireddy, Bangalore (IN); Rajib Datta, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/470,205

(22) PCT Filed: Dec. 16, 2016

(86) PCT No.: PCT/US2016/067070
§ 371 (c)(1),
(2) Date: Jun. 15, 2019

(87) PCT Pub. No.: WO2018/111290
PCT Pub. Date: Jun. 21, 2018

(65) Prior Publication Data
US 2020/0088167 A1 Mar. 19, 2020

(51) Int. Cl.
*F03D 7/04* (2006.01)
*F03D 7/02* (2006.01)
*H02J 3/38* (2006.01)

(52) U.S. Cl.
CPC ........... *F03D 7/048* (2013.01); *F03D 7/0272* (2013.01); *F03D 7/0284* (2013.01); *H02J 3/386* (2013.01); *F05B 2270/337* (2013.01)

(58) Field of Classification Search
CPC ...... F03D 7/048; F03D 7/0272; F03D 7/0284; H02J 3/386; F05B 2270/337
See application file for complete search history.

(56) References Cited

U.S. PATENT DOCUMENTS

2008/0088131 A1* 4/2008 Thisted .................. F03D 9/255
290/44
2010/0049371 A1* 2/2010 Martin ................... G06Q 50/06
700/291

(Continued)

FOREIGN PATENT DOCUMENTS

EP 1 914 872 A1 4/2008

OTHER PUBLICATIONS

PCT Search Report, dated Jun. 30, 2017.
(Continued)

*Primary Examiner* — Sean Gugger
(74) *Attorney, Agent, or Firm* — Dority & Manning, P.A.

(57) ABSTRACT

A wind farm is presented. The wind farm includes a plurality of wind turbine stations, where each wind turbine station includes a wind turbine and a generator sub-system. The generator sub-system includes a doubly-fed induction generator configured to generate an alternating current voltage and a wind turbine station power converter. The wind farm further includes a power collection sub-system that includes a power bus and a sub-station power converter. The wind farm also includes a control system configured to determine a wind speed metric, estimate a corresponding frequency metric, calculate a desirable frequency based on the wind speed metric and frequency compensation ranges of the wind turbine station power converters, and generate and communicate control commands to the sub-station power converter based on the desirable frequency to allow the sub-station power converter to update a line frequency of a power bus voltage based on the desirable frequency.

18 Claims, 4 Drawing Sheets

(56) References Cited

U.S. PATENT DOCUMENTS

| | | | |
|---|---|---|---|
| 2010/0298344 A1* | 11/2010 | Mousa | A61P 17/06 |
| | | | 514/256 |
| 2010/0320762 A1* | 12/2010 | Letas | H02P 9/007 |
| | | | 290/44 |
| 2011/0001318 A1 | 1/2011 | Nelson | |
| 2011/0285130 A1 | 11/2011 | Thisted | |
| 2012/0004781 A1* | 1/2012 | Santos | H02J 3/24 |
| | | | 700/287 |
| 2013/0038072 A1* | 2/2013 | Miller | F01D 17/162 |
| | | | 290/40 B |
| 2015/0092462 A1* | 4/2015 | Ohori | H02M 1/42 |
| | | | 363/71 |
| 2017/0170765 A1* | 6/2017 | Blackwelder | H02P 9/08 |
| 2018/0097365 A1* | 4/2018 | Adamczyk | H02J 3/386 |
| 2019/0173403 A1* | 6/2019 | Blackwelder | H02J 3/40 |
| 2019/0323717 A1* | 10/2019 | Xu | F24F 11/70 |

OTHER PUBLICATIONS

Muljadi Eduard et al.: Doubly Fed Induction Generator in an Offshore Wind Power Plant Operated at Rated V/Hz:, IEEE Transactions on Industry Applications, IEEE Service Center, Piscataway, NJ, vol. 49, No. 5, Sep. 1, 2013, pp. 2197-2205.

* cited by examiner

WIND FARM TOPOLOGY AND METHOD OF OPERATING THE SAME

BACKGROUND

Embodiments of the present specification generally relate to a wind farm and in particular, to a wind farm topology and method of operating the wind farm.

A wind farm typically includes a plurality of wind turbine stations, such as wind turbine towers, capable of converting a kinetic energy of wind into electrical power. Currently, wind farms having different configurations are used to generate the electrical power. In general, these wind farms include one or more of wind turbine stations operable at a fixed speed, wind turbine stations performing full power conversion, and wind turbine stations performing partial power conversion.

The wind farms having wind turbine stations operable at the fixed speed generally include an asynchronous generator and a wind turbine level step-up transformer. Typically, such wind farms suffer from losses in an annual energy production (AEP) due to variations in wind speed in the wind farm. Moreover, the wind farms having the wind turbine stations performing full power conversion generally include squirrel-cage induction generators or synchronous generators along with full power converters. In certain situations, the full power conversion based wind farms are also prone to losses in the AEP due to variations in the wind speed in the wind farms. Furthermore, the wind farms having the wind turbine stations performing partial power conversion generally include a doubly-fed induction generator (DFIG) coupled to each wind turbine. The DFIG includes a partial power converter that enables electrical power generation at a grid frequency irrespective of variations in the wind speed in the wind farm. Such a wind turbine station that is capable of generating electrical power at the grid frequency generally utilizes available wind resources more efficiently than the wind turbine stations operable at the fixed speed, especially during low wind conditions.

However, currently available DFIG based wind turbine stations entail use of a partial power converter that is typically rated at about 25-35% of the total power generated by the DFIG to compensate for large frequency variations caused by changes in the wind speed. Such a configuration of the partial power converter tends to be bulky and requires a large foot print. Additionally, in many wind turbine stations, the DFIG is coupled to the grid via an expensive three-winding step-up transformer.

BRIEF DESCRIPTION

In accordance with aspects of the present specification, a wind farm is presented. The wind farm includes a plurality of wind turbine stations, where each of the plurality of wind turbine stations includes a wind turbine and a generator sub-system operatively coupled to the wind turbine. The generator sub-system includes a doubly-fed induction generator configured to generate an alternating current voltage and a wind turbine station power converter electrically coupled to the doubly-fed induction generator. Furthermore, the wind farm includes a power collection sub-system electrically coupled to the plurality of wind turbine stations, where the power collection sub-system includes a power bus electrically coupled to the generator sub-systems of the plurality of wind turbine stations and a sub-station power converter electrically coupled to the power bus. Moreover, the wind farm also includes a control system operatively coupled to the wind turbine station power converters of the plurality of wind turbine stations and the sub-station power converter, where the control system is configured to determine a wind speed metric, estimate a frequency metric corresponding to the wind speed metric, calculate a desirable frequency based on the wind speed metric and frequency compensation ranges of the wind turbine station power converters such that a difference between the desirable frequency and the frequency metric is within the frequency compensation ranges of the wind turbine station power converters. Additionally, the control system is also configured to generate and communicate control commands to the sub-station power converter based on the desirable frequency. The sub-station power converter is configured to update a line frequency of a power bus voltage based on the desirable frequency to control power generation by the plurality of wind turbine stations.

In accordance with another aspect of the present specification, a method for operating a wind farm is presented. The wind farm includes a plurality of wind turbine stations, a control system, and a power collection sub-system electrically coupled to the plurality of wind turbine stations, where each of the plurality of wind turbine stations includes a wind turbine and a generator sub-system having a doubly-fed induction generator and a wind turbine station power converter, where the power collection sub-system includes a power bus and a sub-station power converter. The method includes determining a wind speed metric corresponding to the plurality of wind turbine stations, estimating a frequency metric corresponding to the wind speed metric, calculating a desirable frequency of the power bus based on the wind speed metric and frequency compensation ranges of the wind turbine station power converters such that a difference between the desirable frequency and the frequency metric is within the frequency compensation ranges of the wind turbine station power converters, generating control commands based on the desirable frequency, and communicating control commands to the sub-station power converter for updating a line frequency of a power bus voltage based on the desirable frequency.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of a wind farm and a method for operating the wind farm are presented. In particular, embodiments of the wind farm presented herein employ wind turbine station power converters having a smaller footprint than the foot print of power converters used in traditional wind farms. Also, the embodiments of the wind farm and/or wind turbine stations presented hereinafter circumvent the need for expensive and bulky pad-mount transformers that are typically used in the traditional wind farms. Use of the smaller wind turbine station power converters and an absence of the bulky pad-mount transformer aid in reducing the footprint of the wind turbine stations.

Figure 1:
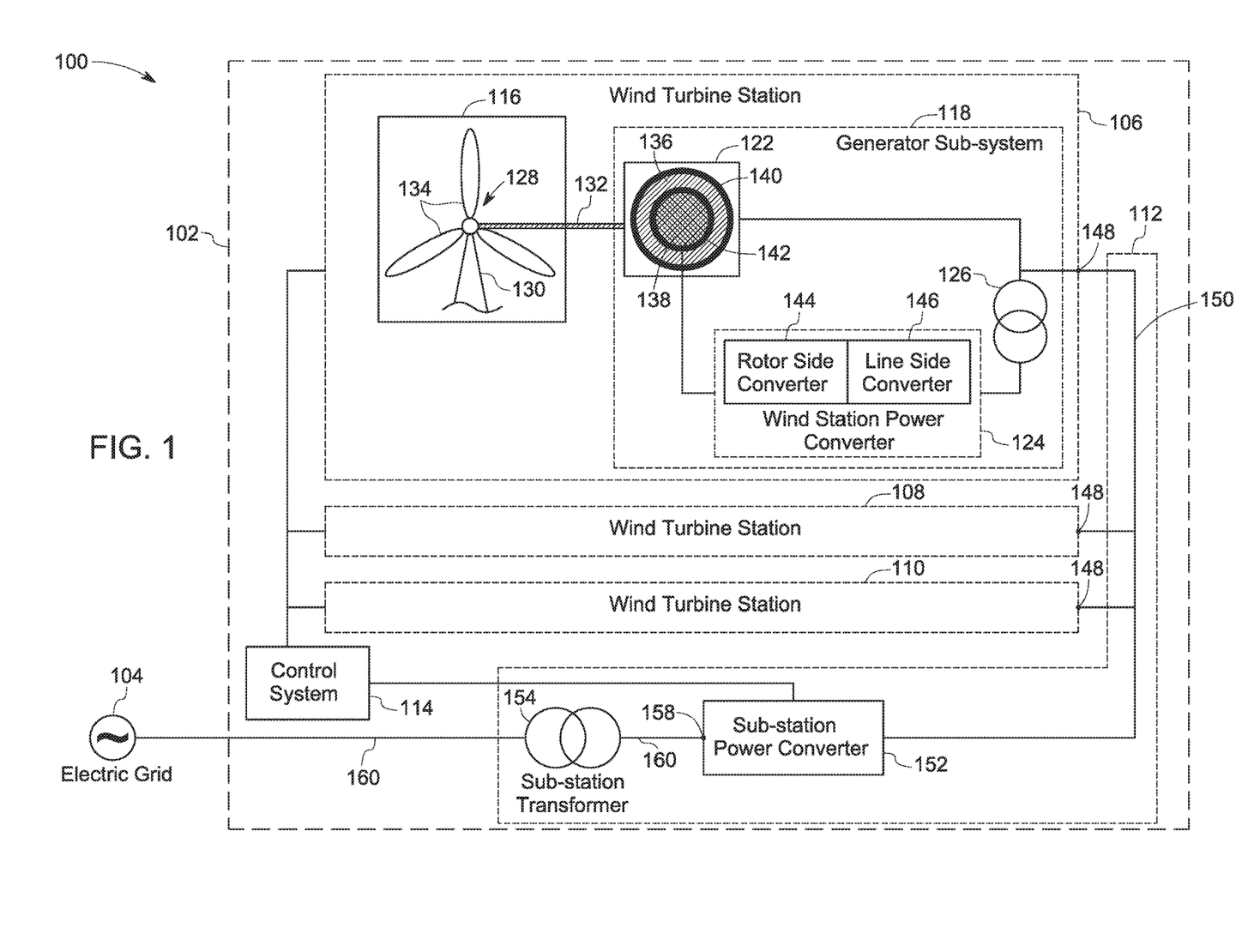
FIG. 1 is a diagrammatic representation of a wind farm, in accordance with aspects of the present specification.

FIG. 1 is a diagrammatic representation 100 of a wind farm 102, in accordance with aspects of the present specification. In some embodiments, the wind farm 102 may be electrically coupled to an electric grid 104 and configured to provide power to the electric grid 104. The wind farm 102 includes a plurality of wind turbine stations 106, 108, and 110 and a power collection sub-system 112 electrically coupled to the plurality of wind turbine stations 106-110. Although three wind turbine stations 106-110 are shown in the embodiment of FIG. 1, a wind farm employing greater or lower number of wind turbine stations is also envisioned. The wind farm 102 also includes a control system 114 operatively coupled to the wind turbine stations 106-110 and the power collection sub-system 112.

The electric grid 104 may be representative of an interconnected network for delivering a grid power (e.g., electricity) from one or more power generation stations to consumers through high/medium voltage transmission lines. By way of example, the electric grid 104 may be a utility power grid, a micro grid, or a mini grid. The term "microgrid," as used herein refers to a power generation and supply system that is capable of supplying electrical power of less than 10 kW. The term "mini-grid," as used herein refers to a power generation and supply system that is capable of supplying electrical power of 10 kW and above. A frequency of a voltage of the electric grid 104 is hereinafter referred to as a grid frequency. By way of example, the grid frequency of a utility power grid in India and the United States are respectively 50 Hz and 60 Hz. The grid frequency of the micro grid and/or mini grid may be similar to or different than the grid frequency of the utility power grid.

In some embodiments, the wind farm 102 is configured to supply voltage and current to the electric grid 104 such that the frequency of the voltage and current supplied by the wind farm 102 is maintained within a grid frequency tolerance range. The grid frequency tolerance range may be defined as a percentage of the grid frequency. By way of example, the grid frequency tolerance range may have a range of frequencies from about −5% of the grid frequency to about +5% of the grid frequency. It may be noted that a zero value of the grid frequency tolerance range indicates that the it is desirable that the frequencies of the voltage and current supplied by the wind farm 102 to the electric grid 104 equal the grid frequency.

For ease of illustration, components of only one wind turbine station 106 are shown in FIG. 1. In the wind farm 102, the wind turbine stations 106-110 may have similar or different configurations. In a presently contemplated configuration, the wind turbine station 106 includes a wind turbine 116 and a generator sub-system 118. The generator sub-system 118 may be operatively coupled to the wind turbine 116. In some embodiments, the generator sub-system 118 includes one or more of a doubly-fed induction generator (DFIG) 122, a wind turbine station power converter 124, and a line-side transformer 126.

In certain embodiments, the wind turbine 116 may include a rotor 128, a tower 130, and a shaft 132 coupled to the rotor 128. The rotor 128 is mounted on the tower 130. Also, a plurality of rotor blades 134 is coupled to the shaft 132. The wind turbine 116 may be operatively coupled to the generator sub-system 118 via the shaft 132. During operation, based on a speed and direction of wind, the rotor blades 134 rotate causing the shaft 132 to rotate. The rotational speed of the shaft 132 may be based on various parameters including, but not limited to, a pitch the rotor blades 134 and a torque exerted on the rotor blades 134.

The DFIG 122 may include a stator 136, a rotor 138, a stator winding 140 disposed on the stator 136, and a rotor winding 142 disposed on the rotor 138. In some embodiments, both the stator winding 140 and the rotor winding 142 may be multi-phase windings, such as a three-phase winding. In the DFIG 122, the stator winding 140 and the rotor winding 142 are configured to facilitate electrical connections to other elements of the generator sub-system 118.

Further, the rotor 138 of the DFIG 122 is typically mechanically coupled to the shaft 132 directly or via a gear mechanism (not shown). Accordingly, any rotation of the shaft 132 due to a force exerted by the wind on the rotor blades 134 may result in the rotation of the rotor 138. The speed of rotation of the rotor 138 of the DFIG 122 is dependent on the wind speed. Also, the rotational speed of the rotor 138 may be a synchronous speed, a sub-synchronous speed, or a super-synchronous speed. In one example, the synchronous speed of the rotor 138 may be defined using equation (1).

$$N_s = \frac{120 * f}{p} \quad (1)$$

In equation (1), $N_s$ represents the synchronous speed of the rotor 138, p represents a number of poles in the rotor 138, and f represents a frequency of a voltage generated at the stator winding 140. Accordingly, a sub-synchronous speed of the rotor 138 may be defined as any speed that is lower than the synchronous speed of the rotor 138. Similarly, a super-synchronous speed of the rotor 138 may be defined as any speed that is higher than the synchronous speed of the rotor 138.

During operation, when the rotor 138 is rotated, the DFIG 122 may be configured to generate an alternating current (AC) voltage at the stator winding 140. The AC voltage generated at the stator winding 140 is hereinafter referred to as a stator voltage. Moreover, the DFIG 122 may also be configured to generate or absorb an AC voltage at the rotor winding 142 based on the operating speed of the rotor 138. By way of example, the DFIG 122 may be configured to generate an AC voltage at the rotor winding 142 when the rotor 138 is operated at the super-synchronous speed. However, the DFIG 122 may be configured to absorb an AC voltage at the rotor winding 142 when the rotor 138 is operated at the sub-synchronous speed. A magnitude of the voltage generated or absorbed by the rotor winding 142 may be based on a slip value (S) of the DFIG 122. In one embodiment, the slip value S may be determined using equation (2).

$$S = \frac{N_s - N_r}{N_s} \quad (2)$$

where $N_s$ represents the synchronous speed of the rotor 138 and $N_r$ represents revolutions per minute (rpm) of the rotor 138.

Typically, a frequency of a voltage generated by a generator coupled to a wind turbine is dependent on the wind speed in the vicinity of the wind-turbine. For example, variations in the wind speed in the vicinity of the wind turbine result in variations in the frequency of the voltage generated by the generator. Consequently, in certain instances, the frequency of the voltage generated by the generator may not match a frequency of a grid voltage or a frequency of a power collection sub-system. In accordance with aspects of the present specification, the wind turbine station power converter 124 is configured to modify the frequency of the stator voltage generated by the DFIG 122 such that the frequency of the stator voltage generated by the DFIG 122 is equal to the grid frequency or a frequency of the power collection sub-system 112.

In some embodiments, the wind turbine station power converter 124 is configured to introduce a variation in the frequency of the stator voltage generated by the DFIG 122. In particular, the wind turbine station power converter 124 is configured to introduce variations in the frequency of the stator voltage based on a frequency compensation range of the wind turbine station power converter 124. The term "frequency compensation range" as used herein is representative of a range of frequency variations that the wind turbine station power converter 124 is capable of introducing in the stator voltage generated by the DFIG 122. By way of example, if the frequency compensation range of the wind turbine station power converter 124 is 0-10 Hz, the wind turbine station power converter 124 is capable of introducing frequency variations in the stator voltage in a range from about +10 Hz to about −10 Hz.

Typically, in traditional configurations of wind turbine stations, converters with a larger footprint are used in conjunction with a DFIG as these converters are generally rated at about 25-35% of the total power generated by the DFIG. In accordance with the aspects of the present specification, a converter having a smaller footprint may be used in the generator sub-system 118. More particularly, the frequency compensation range of the wind turbine station power converter 124 may be selected such that the wind turbine station power converter 124 may have a smaller footprint than that of the conventional converters used in the traditional wind turbine stations. Specifically, the smaller footprint of the wind turbine power converter 124 may be achieved by selecting a narrow frequency compensation range.

Moreover, an amount of frequency variation introduced by the wind turbine station power converter 124 in the stator voltage is dependent on a current being drawn from the rotor winding 142 or a current being supplied to the rotor winding 142 by the wind turbine station power converter 124. By way of example, a lower value of current being drawn from the rotor winding 142 or a lower value of current being supplied to the rotor winding 142 by the wind turbine station power converter 124 results in a smaller value of frequency variation introduced by the wind turbine station power converter 124 in the stator voltage. Therefore, use of a narrow frequency compensation range results in a lower value of the current being drawn from the rotor winding 142 by the wind turbine station power converter 124 or the current being supplied to the rotor winding 142.

Furthermore, a power rating and/or a rated current capacity of the wind turbine station power converter 124 is dependent on the amount of current drawn from the rotor winding 142 or supplied to the rotor winding 142 by the wind turbine station power converter 124. Consequently, employing the narrow frequency compensation range allows use of a wind turbine station power converter 124 having a lower rated current capacity or lower power rating, which in turn results in the wind turbine station power converter 124 having a smaller footprint than those of the traditional wind turbine station power converters. By way of example, in the configuration of FIG. 1, the wind turbine station power converter 124 may be rated at about 5%-10% of the power generated by the DFIG 122.

As previously noted, the magnitude of the AC voltage and/or current generated or absorbed by the rotor winding 142 may be based on a slip value S of the DFIG 122. Also, the amount of frequency variation and hence the frequency compensation range are dependent on the current generated or absorbed by the rotor winding 142. Therefore, in certain embodiments, the frequency compensation range of the wind turbine station power converter 124 may also be defined or constrained by adjusting the slip value S.

In some embodiments, the wind turbine station power converter 124 may include an AC-AC converter. In the specific embodiment of FIG. 1, the wind turbine station power converter 124 includes a rotor-side converter 144 and a line-side converter 146. The rotor-side converter 144 includes an AC-DC converter configured to convert an AC power into a DC power or vice-versa, and the line-side converter 146 includes a DC-AC converter configured to convert the DC power into an AC power or vice-versa. The rotor-side converter 144 and the line-side converter 146 are electrically coupled to each other via a DC-link (not shown). The rotor-side converter 144 is electrically coupled to the rotor winding 142 of the DFIG 122. The line-side converter 146 is electrically coupled to the stator winding 140 of the DFIG 122 directly or via the line-side transformer 126, as shown in FIG. 1. Further, in some embodiments, the stator winding 140 may be directly coupled to an electrical node 148, at an output of the wind turbine station 106. The electrical node 148 may generally be referred to as an output electrical node 148. Also, in some embodiments, the line-side converter 146 may be coupled to the output electrical node 148 via the line-side transformer 126.

Figure 2:
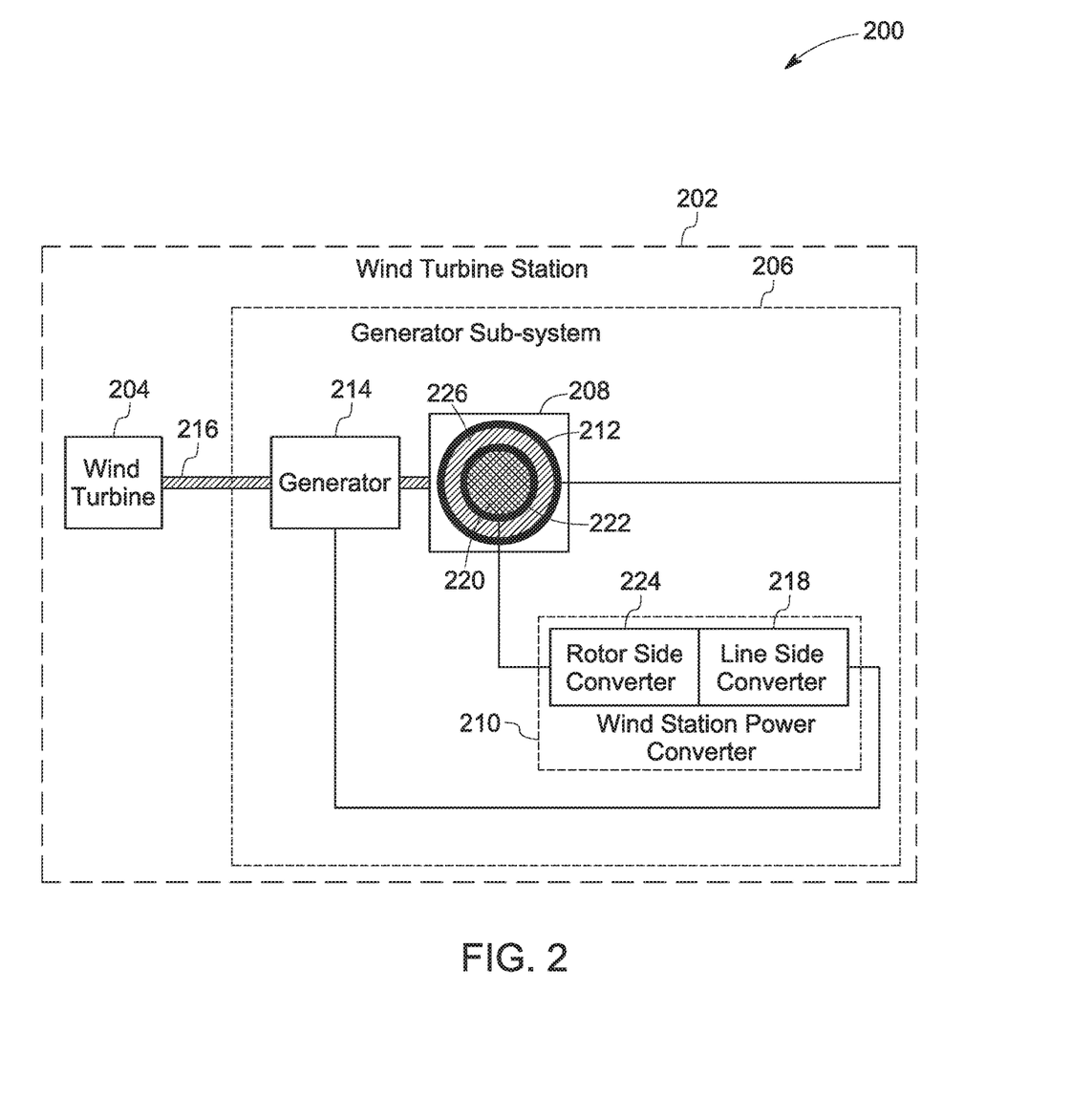
FIG. 2 is a diagrammatic representation of another embodiment of a wind station for use in the wind farm of FIG. 1, in accordance with aspects of the present specification.

It may be noted that configurations of the other wind turbine stations 108, 110 may be similar to the configuration of the wind turbine station 106. However, in other embodiments, the configurations of the other wind turbine stations 108, 110 may be different from the configuration of the wind turbine station 106. One such alternate configuration of the wind turbine station 106 is illustrated in FIG. 2

In some embodiments, the power collection sub-system 112 may be electrically coupled to each of the wind turbine stations 106-110. The power collection sub-system 112 includes a power bus 150 and a sub-station power converter 152 electrically coupled to the power bus 150. The power bus 150 may be electrically coupled to the output electrical nodes 148 of each of the wind turbine stations 106-110 to receive electrical power from each of the wind turbine stations 106-110. The power bus 150 may be a three-phase bus configured to carry a three phase AC power. The sub-station power converter 152 typically includes an AC-AC power converter. In certain embodiments, the sub-station power converter 152 may include an AC-DC converter coupled to a DC-AC converter via a DC-link.

In some embodiments, the sub-station power converter 152 of the power collection sub-system 112 may be coupled to the electric grid 104 via a sub-station transformer 154. More particularly, the sub-station transformer 154 may be coupled between an output 158 of the sub-station power converter 152 and the electric grid 104 along an interconnect bus 160. The sub-station transformer 154 is used to electrically isolate the sub-station power converter 152 from the electric grid 104, thereby protecting the sub-station power converter 152 from any abnormality at the electric grid 104. In certain embodiments, the output 158 of the sub-station power converter 152 may be directly connected to the electric grid 104 using the interconnect bus 160.

As previously noted, the control system 114 is operatively coupled to the wind turbine stations 106-110 and the power collection sub-system 112. More particularly, the control system 114 may be operatively coupled to the wind turbine station power converter 124 of each of the plurality of wind turbine stations 106-110 and the sub-station power converter 152 to control the functioning of the wind turbine station power converters 124 and the sub-station power converter 152. Although a single control system 114 is shown in FIG. 1 for ease of illustration, multiple control system may be employed.

In some embodiments, the control system 114 may include a specially programmed general purpose computer, a microprocessor, a digital signal processor, and/or a microcontroller. The control system 114 may also include input/output ports, and a storage medium, such as, an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, control system 114 may be implemented as hardware elements such as circuit boards with processors or as software running on a processor such as a commercial, off-the-shelf personal computer (PC), or a microcontroller.

In some embodiments, the control system 114 is configured to communicate control signals or control commands to the wind turbine station power converters 124 of each of the plurality of wind turbine stations 106-110 and the sub-station power converter 152 to control the functioning of the wind turbine stations 106-110 and the sub-station power converter 152. By way of example, the control system 114 is configured to communicate control signals or control commands to the wind turbine station power converters 124 of each wind turbine station 106-110 and the sub-station power converter 152 to update a line frequency of the power bus voltage based on the respective frequency compensation ranges of the wind turbine station power converters 124 of each wind turbine station 106-110 and facilitate generation of an AC voltage having a frequency that matches the line frequency of the power bus voltage.

Moreover, the control system 114 is configured to determine a wind speed metric. Various examples of the wind speed metric may include, but are not limited to, an average wind speed within the wind farm 102, a weighted average wind speed within the wind farm 102 an instantaneous wind speed within the wind farm 102, or combinations thereof. In some embodiments, values of the average wind speed, the weighted average wind speed, the instantaneous wind speed, or combinations thereof may be received from a satellite.

In certain embodiments, to aid in the determination of the wind speed metric, each wind turbine station 106-110 may include one or more wind speed sensors (not shown) that are communicatively coupled to the control system 114. In one embodiment, the wind speed sensors may be disposed on the respective towers 130 of the corresponding wind turbines 116. Also, the wind speed sensors may be configured to generate signals indicative of an instantaneous wind speed at the respective locations of the sensors and to communicate the signals indicative of the instantaneous wind speed to the control system 114. The control system 114 may be employed to determine the wind speed metric based on the signals received from the wind speed sensors.

The control system 114 is further configured to estimate a frequency metric corresponding to the wind speed metric. The term 'frequency metric' is used to refer to a frequency of the stator voltage that is generated at the stator winding 140 of the DFIG 122 if the rotor winding 142 is shorted. It may be noted that a configuration of the DFIG 122 when the rotor winding 142 is shorted corresponds to a configuration of a typical synchronous generator. Accordingly, the term 'frequency metric' may be representative of a frequency of a stator voltage generated by the typical synchronous generator without any frequency compensation. The control system 114 is configured to estimate the frequency metric corresponding to the wind speed metric based on one or more of the rpm $N_r$ of the rotor 138 and a number of poles p of the rotor 138, where the rpm $N_r$ of the rotor 138 is dependent on the wind speed metric. More particularly, in certain embodiments, in addition to the wind speed metric, the rpm $N_r$ of the rotor 138 is dependent on parameters including, but not limited to, dimensions of the rotor blades 134, a pitch of the rotor blades 134, a gear ratio between the wind turbine 116 and the DFIG 122, or combinations thereof. Moreover, in the present configuration of FIG. 1, it is assumed that all the DFIGs 122 have a similar number of poles p. Accordingly, a value of the frequency metric is similar for all the DFIGs 122 in the wind farm 102. In one example, the frequency metric $f_m$ may be determined using equation (3).

$$f_m = \frac{N_r * p}{120} \quad (3)$$

Furthermore, the control system 114 is configured to calculate a desirable frequency for the power bus 150. The term "desirable frequency" is used to refer to a desirable value of a line frequency of the power bus voltage of the power bus 150. In particular, the desirable frequency is calculated based on the wind speed metric and frequency compensation ranges of the wind turbine station power converters 124 such that a difference between the calculated desirable frequency and the frequency metric is within the frequency compensation ranges of the wind turbine station power converters 124 of the wind turbine stations 106. As previously noted, the wind turbine station power converters 124 having narrow frequency compensation ranges are employed in the wind farm 102. Calculating the desirable frequency based on the frequency compensation ranges of the corresponding wind station power converters 124 allows/enables the wind turbine station power converters 124 to adjust the frequencies of the respective stator voltages such that the frequencies of the respective stator voltages are maintained within a line frequency tolerance range. The line frequency tolerance range may be defined as a percentage of a line frequency of the power bus voltage. By way of example, the line frequency tolerance range may have a range of frequencies from about −5% of the line frequency to about +5% of the line frequency.

Additionally, the control system 114 is configured to generate control commands for the sub-station power converter 152 based on the desirable frequency. The control system 114 is also configured to communicate the control commands to the sub-station power converter 152. In response to such control commands, the sub-station power converter 152 is configured to update the line frequency of the power bus voltage to control power generation by the plurality of wind turbine stations 106-110. More particularly, the sub-station power converter 152 is configured to update the line frequency of the power bus voltage to match the desirable frequency. By way of example, if the frequency compensation range of the wind turbine station power converters 124 is 0-10 Hz and the frequency metric for a given wind speed metric is 30 Hz, the calculated desirable frequency may be a value in a range from about 30 Hz to about 40 Hz. In one example, the calculated desirable frequency may be 35 Hz. Accordingly, the sub-station power converter 152 is configured to update the line frequency of the power bus voltage to match the calculated desirable frequency of 35 Hz.

In certain embodiments, the control system 114 is configured to compute a desirable value of a power bus voltage. In particular, the control system 114 is configured to compute the desirable value of the power bus voltage value based at least on the computed desirable frequency such that a ratio of the desirable value of the power bus voltage and the computed desirable frequency is constant or remains substantially constant. In some embodiments, the control system 114 is configured to generate control commands for the sub-station power converter 152 based on the computed desirable value of the power bus voltage. Additionally, the control system 114 is configured to communicate the control commands to the sub-station power converter 152. The sub-station power converter 152 is configured to update the magnitude of the power bus voltage of the power bus 150 to match the computed desirable value of the power bus voltage value based on the control commands received from the control system 114.

Furthermore, the control system 114 is configured to generate control commands for the wind turbine station power converters 124 of the wind turbine stations 106-110 based on the line frequency of the power bus voltage. The control system 114 is also configured to communicate the control commands to the wind turbine station power converters 124 of the wind turbine stations 106-110. The wind turbine station power converters 124 are configured to set a frequency of the stator voltage generated by the respective DFIG 122 to a value within a line frequency tolerance range of the power bus voltage. In some embodiments, the line frequency tolerance range may be zero. In this example, it is desirable that the frequency of the stator voltage generated by the respective DFIGs 122 and the line frequency of the power bus voltage have substantially similar values/equal values. As previously noted, the line frequency tolerance range is defined as a percentage of a line frequency of the power bus voltage. Also, a zero value of the line frequency tolerance range indicates that it is desirable that the frequency of the stator voltage supplied by the DFIG 122 to the power bus 150 is equal to the line frequency of the power bus voltage.

Moreover, in situations where the rotor 138 of the DFIG 122 is operating at a sub-synchronous speed, upon receiving the control commands from the control system 114, a wind turbine station power converter 124 is configured to supply a current to the corresponding rotor winding 142 such that the frequency of the respective stator voltage is maintained within the line frequency tolerance range. In this example, subsequent to receiving the control commands from the control system 114, to modify the frequency of the stator voltage, the respective wind turbine station power converter 124 may be configured to supply a current to the respective rotor winding 142 such that the frequency of the stator voltage is maintained at 35 Hz, while assuming that the line frequency tolerance range is 0. The current that is supplied to the rotor winding 142 may be drawn from the stator winding 140 via the line-side converter 146 and the rotor-side converter 144. Accordingly, the line-side converter 146 may be operated as an AC to DC converter and the rotor-side converter 144 may be operated as a DC to AC converter.

Also, in situations where the rotor 138 of the DFIG 122 is operating at a super-synchronous speed, upon receiving the control commands from the control system 114, the respective wind turbine station power converter 124 is configured to draw a current from the corresponding rotor winding 142 such that the frequency of the respective stator voltage is maintained within the line frequency tolerance range. In this example, upon receiving the control commands from the control system 114, to modify a frequency of the stator voltage, the respective wind turbine station power converter 124 may be configured to draw a current from the corresponding rotor winding 142 such that the frequency of the respective stator voltage is maintained at 35 Hz, while assuming that the line frequency tolerance range is 0. Accordingly, the rotor-side converter 144 may be operated as an AC to DC converter and the line-side converter 146 may be operated as a DC to AC converter.

Additionally, the control system 114 is configured to communicate control commands to the sub-station power converter 152 to facilitate generation of an output voltage having a target frequency at the output 158 of the sub-station power converter 152 based on the power bus voltage. As previously noted, the power bus voltage is maintained at the line frequency which may have a different value from that of the grid frequency. It may be desirable that the output voltage supplied by the wind farm 102 to the electric grid 104 via the interconnect bus 160 is compatible with the grid voltage to facilitate efficient supply of the power from the wind farm 102 to the electric grid 104. More particularly, it may be desirable that a frequency of the output voltage supplied by the wind farm 102 to the electric grid 104 is equal to the grid frequency. Accordingly, the sub-station power converter 152 is configured to generate an output voltage having a target frequency at the output 158 of the sub-station power converter 152. The target frequency is representative of a frequency that lies within the grid frequency tolerance range. Subsequently, the output voltage having the target frequency may be supplied to the electric grid 104 either via the interconnect bus 160 or directly from the sub-station transformer 154.

In certain situations, the wind farm 102 may be configured to supply a reactive power to the electric grid 104. Traditionally, a generator associated with a wind turbine is configured to generate the reactive power. However, an owner of the wind farm or the wind turbine station is not entitled to receive any monetary compensation for the supplied reactive power. The wind farm 102 is configured to circumvent the aforementioned issues. In particular, the sub-station power converter 152 is configured to generate the reactive power, while the wind turbine stations 106-110 are configured to generate more active power.

In accordance with aspects of the present specification, an amount of the reactive power to be supplied to the electric grid 104 is determined by the control system 114. In one embodiment, the control system 114 may be configured to determine the amount of reactive power to be supplied based on a magnitude of the output voltage of the sub-station power converter 152. In another embodiment, the control system 114 may be configured to receive information related to the amount of the reactive power to be supplied to the electric grid 104 from an operator of the electric grid 104. Subsequent to determining the amount of reactive power to be supplied to the electric grid 104, the control system 114 may be configured to generate and communicate control commands to the sub-station power converter 152 to facilitate generation of the desired amount of the reactive power. In response to the control commands from the control system 114, the sub-station power converter 152 is configured to generate and supply the reactive power to the electric grid 104.

As noted hereinabove, under the supervisory control of the control system 114, the sub-station power converter 152 updates the line frequency of the power bus voltage based on the desirable frequency of the power bus 150. It may be noted that the sub-station power converter 152 is configured to update the line frequency of the power bus voltage independent of the grid frequency. Accordingly, the wind turbine stations 106-110 are configured to provide voltages having a frequency that is equal to the line frequency of the power bus 150 or have values within the line frequency tolerance range.

Since the line frequency of the power bus 150 is based on the frequency compensation ranges of the wind turbine station power converters 124 and the wind speed metric associated with the wind farm 102, the wind turbine station power converters 124 having narrow frequency compensation ranges may be employed in the wind farm 102. In addition, such wind turbine station power converters 124 having narrow frequency compensation ranges are less bulky and have smaller footprints than traditional alternatives. Moreover, in the presently contemplated configuration of FIG. 1, while the wind turbine station power converters 124 having narrow compensation ranges are an integral part of the wind turbine stations 106-110, the sub-station power converter 152 is disposed external to the wind turbine stations 106-110. Also, the sub-station power converter 152 is configured to convert the power bus voltage having the line frequency to the output voltage having the target frequency, thereby ensuring compatibility with grid requirements.

Moreover, by using the sub-station power converter 152 to facilitate full-scale conversion in addition to a partial power conversion facilitated by the wind turbine station power converter 124, the wind turbine stations 106-110 may be directly connected to the power collection sub-system 112 without the use of any pad-mount transformers therebetween. More particularly, the stator windings 140 of the DFIGs 122 of the wind turbine stations 106-110 may be directly connected to the power bus 150 of the power collection sub-system 112, thereby circumventing the need for any transformers.

It may be noted that in the embodiment of FIG. 1, any reduction in the amount of frequency variations introduced by the wind turbine station power converter 124 may result in an increase in the size of the line-side transformer 126. In such instances, an embodiment of the wind turbine station 200 of FIG. 2 provides an alternative configuration of the wind turbine station that circumvents use of a bulkier line-side transformer.

Referring now to FIG. 2, a diagrammatic representation 200 of another embodiment 202 of the wind turbine station 106 of FIG. 1, in accordance with aspects of the present specification, is presented. The wind turbine station 202 includes a wind turbine 204 operatively coupled to a generator sub-system 206. In some embodiments, the generator sub-system 206 includes one or more of a doubly-fed induction generator (DFIG) 208, a wind turbine station power converter 210, and a generator 214. The generator 214 may be a permanent magnet based generator or an induction generator. The DFIG 208 in turn includes a stator 226, a stator winding 212, a rotor 220, and a rotor winding 222. Also, the wind turbine station power converter 210 includes a line-side converter 218 and a rotor-side converter 224. The wind turbine 204, the DFIG 208, and wind turbine station power converter 210 are similar to the corresponding elements of FIG. 1.

In the embodiment of FIG. 2, the generator 214 may be disposed on a shaft 216 between the wind turbine 204 and the DFIG 208. More particularly, a rotor (not shown) of the generator 214 may be coupled to the shaft 216. The generator 214 may also be electrically coupled to the wind turbine station power converter 210. In particular, a stator winding (not shown) of the generator 214 may be electrically coupled to the line-side converter 218 of the wind turbine station power converter 210.

In some embodiments, when the DFIG 208 is operating at a super-synchronous speed, the line-side converter 218 of the wind turbine station power converter 210 is configured to provide electrical excitation to the stator winding of the generator 214. The electrical excitation may be provided via use of a current drawn from the rotor winding 222 of the DFIG 208 via the rotor-side converter 224 and the line-side converter 218. Also, the electrical excitation provided to the stator winding of the generator 214 may introduce variations in the rotational speed of the rotor of the generator 214. The variations in the rotational speed of the rotor of the generator 214 depend on the magnitude of the electrical excitation provided to the stator winding of the generator 214. Furthermore, the variations introduced in the rotational speed of the rotor may in turn modulate the rotational speed of the shaft 216 and that of the rotor 220 of the DFIG 208. Moreover, variations in the rotational speed of the rotor 220 of the DFIG 208 may in turn introduce variations in the stator voltage generated by the stator winding 212 of the DFIG 208. Accordingly, the generator 214 may be configured to set a frequency of the AC voltage generated by the DFIG 208 to a value within the line frequency tolerance range based on the electrical excitation provided by the wind turbine station power converter 210. The amount of the electrical excitation provided by the wind turbine station power converter 210 may be controlled by the line-side converter 218 to facilitate introduction of a desirable frequency variation in the stator voltage generated by the DFIG 208.

It may be noted that when the DFIG 208 is operating at a sub-synchronous speed, the line-side converter 218 of the wind turbine station power converter 210 is configured to draw a current generated at the stator winding of the generator 214. The line-side converter 218 is configured to supply the drawn current to the rotor winding 222 of the DFIG 208 via the rotor-side converter 224 such that the frequency of the stator voltage generated by the DFIG 208 has a value within the line frequency tolerance range. Also, the magnitude of the current drawn from the stator winding of the generator 214 may be controlled by the line-side converter 218 to facilitate introduction of a desirable frequency variation in the stator voltage generated by the DFIG 208.

As previously noted with reference to the wind turbine station 106 of FIG. 1, the wind station power converter 124 is configured to supply a current to the rotor winding 142 or draw a current from the rotor winding 142 to vary the frequency of the stator voltage via use of the line-side transformer 126. Also, the current that is drawn from the rotor winding 142 is supplied to the stator winding 140 via the line-side transformer 126.

However, in the configuration of the wind turbine station 202 of FIG. 2, the use of the generator 214 circumvents a need to couple the wind turbine station power converter 210 to the stator winding 212 of the DFIG 208. Accordingly, the configuration of the wind turbine station 202 of FIG. 2 advantageously aids in circumventing the use of line side transformers that are typically bulky when handling lower frequencies and/or lower currents.

Figure 3:
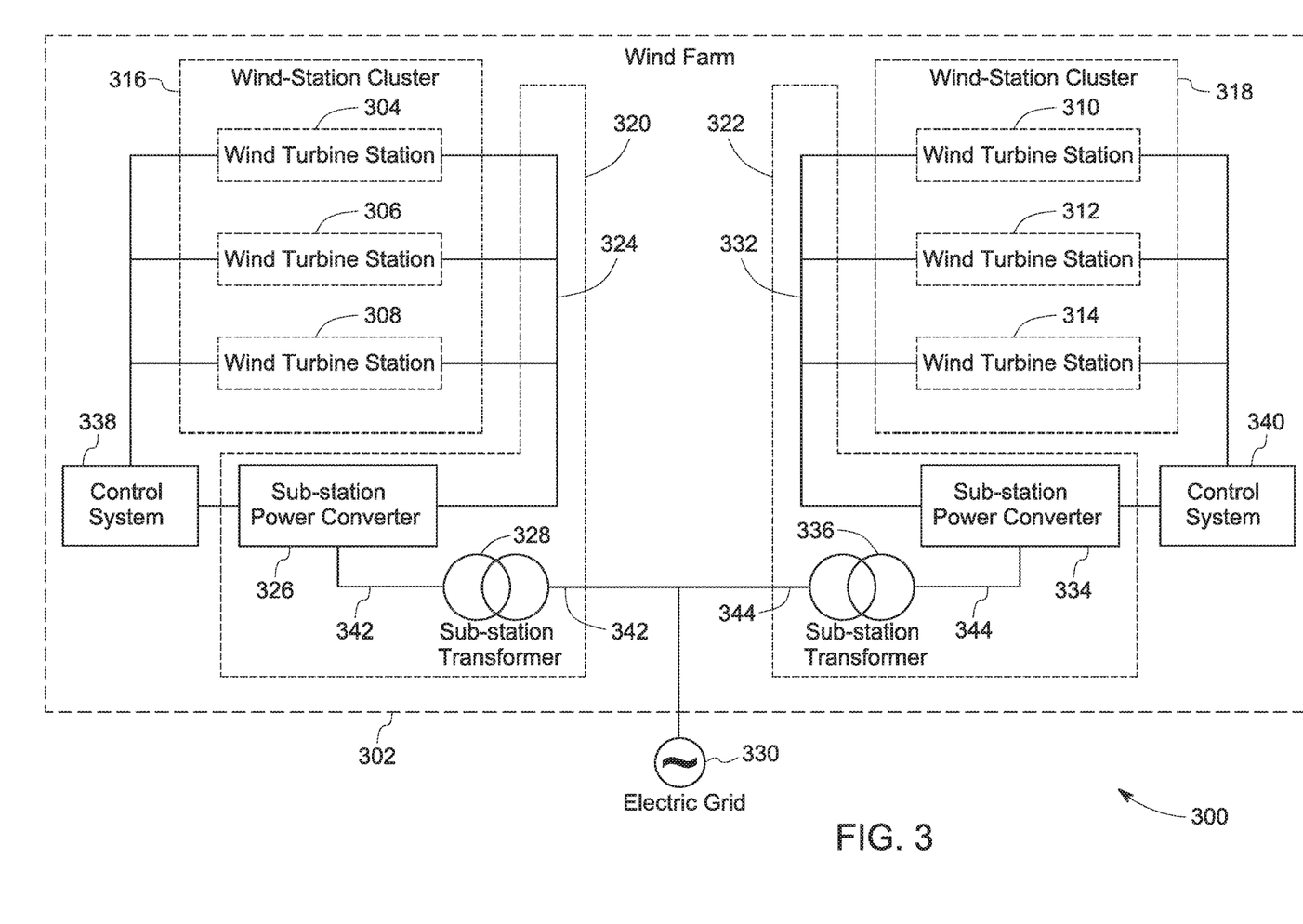
FIG. 3 is a diagrammatic representation of another embodiment of a wind farm, in accordance with aspects of the present specification.

In certain instances, when the wind farm encompasses a large area or the wind farm is distributed over different terrains, the wind speed may not be uniform within the wind farm. For example, the wind turbine stations disposed at different locations within such a wind farm may experience different wind speeds. Accordingly, operating the wind turbine station power converters of all the wind turbine stations to generate a stator voltage having a common line frequency may be detrimental to the performance and/or life of some of the wind turbine station power converters. In such instances, a different configuration of the wind farm may be desirable. FIG. 3 represents a diagrammatic representation 300 of one such wind farm 302, in accordance with aspects of the present specification.

The wind farm 302 includes wind turbine stations 304, 306, 308, 310, 312, and 314. One or more of the wind turbine stations 304-314 may be representative of one embodiment of the wind turbine station 106 of FIG. 1 or the wind turbine station 202 of FIG. 2. Although, the wind farm 302 of FIG. 3 is depicted as including six wind turbine stations, use of greater or fewer number of wind turbine stations is also envisioned.

Moreover, in accordance with aspects of the present specification, the wind turbine stations 304-314 may be classified/segmented into a plurality of clusters of wind turbine stations. In some embodiments, the wind turbine stations 304-314 may be classified into different wind turbine station clusters based on their respective locations. For example, wind turbine stations that are located in a particular geographical area or located in a closed vicinity of each other may be classified into the same wind turbine station cluster. In the example of FIG. 3, the wind turbine stations 304-308 are depicted as being a part of a first wind turbine station cluster 316. Similarly, the wind turbine stations 310-314 are depicted as being a part of a second wind turbine station cluster 318. For ease of illustration, the embodiment of FIG. 3 is depicted as including two wind turbine station clusters 316, 318. Also, the wind turbine station cluster 316, 318 are each depicted as including three wind turbine stations. However, use of greater or fewer number of wind turbine station clusters in the wind farm 302 and wind turbine stations in each wind turbine station cluster is also envisioned.

In some embodiments, each of the wind turbine station clusters 316, 318 is electrically coupled to a corresponding power collection sub-system 320, 322. The power collection sub-systems 320, 322 may be representative of one embodiment of the power collection sub-system 112 of FIG. 1. Also, the power collection sub-system 320 includes a power bus 324 and a sub-station power converter 326 electrically coupled to the power bus 324. The power bus 324 is electrically coupled to the wind turbine stations 304, 306, and 308. In some embodiments, the power collection sub-system 320 may also include a sub-station transformer 328 coupled between the sub-station power converter 326 and an electric grid 330 along an interconnect bus 342. In certain embodiments, the sub-station power converter 326 may be directly coupled to the electric grid 330 via the interconnect bus 342.

The power collection sub-system 322 includes a power bus 332 and a sub-station power converter 334 electrically coupled to the power bus 332. In some embodiments, the power collection sub-system 322 may also include a sub-station transformer 336 coupled between the sub-station power converter 334 and the electric grid 330 along an interconnect bus 344. In certain embodiments, the sub-station power converter 334 may be directly coupled to the electric grid 330 via the interconnect bus 344. The power bus 332 is electrically coupled to the wind turbine stations 310, 312, and 314.

The wind farm 302 may further include control systems 338 and 340. The control system 338 may be operatively coupled to the wind turbine stations 304, 306, 308 of the first wind turbine station cluster 316 and the sub-station power converter 326 of the power collection sub-system 320. Also, the control system 338 is configured to communicate control commands to the first wind turbine station cluster 316 and the sub-station power converter 326 of the power collection sub-system 320. Similarly, the control system 340 may be operatively coupled to the wind turbine stations 310, 312, 314 of the second wind turbine station cluster 318 and the sub-station power converter 334 of the power collection sub-system 322. The control system 340 is configured to communicate control commands to the second wind turbine station cluster 318 and the sub-station power converter 334 of the power collection sub-system 322. The control commands generated by the control systems 338, 340 may be used to control the operation of the first and second wind turbine station clusters 316, 318 and the sub-station power converters 326, 334. The control systems 338, 340 may be representative of one embodiment of the control system 114 of FIG. 1.

It may be noted that in the example of FIG. 3, wind speed metrics determined by the control systems 338, 340 may be different. In some embodiments, the control systems 338, 340 are configured to determine the wind speed metrics corresponding to the respective wind turbine station clusters 316, 318. Various examples of the wind speed metrics determined by the control systems 338, 340 may include, but are not limited to, an average wind speed within the respective wind turbine station clusters 316, 318, a weighted average wind speed within the respective wind turbine station clusters 316, 318, an instantaneous wind speed within the respective wind turbine station clusters 316, 318, or combinations thereof.

In the embodiment of FIG. 3, the wind turbine stations 304-314 are classified into different wind turbine station clusters based on their respective locations. This classification ensures that the wind turbine stations in a given wind turbine station cluster experience similar wind speeds. Implementing the wind farm 302 as described hereinabove advantageously aids in circumventing any adverse effects of non-uniform wind speeds within a large wind farm such as the wind farm 302.

Figure 4:
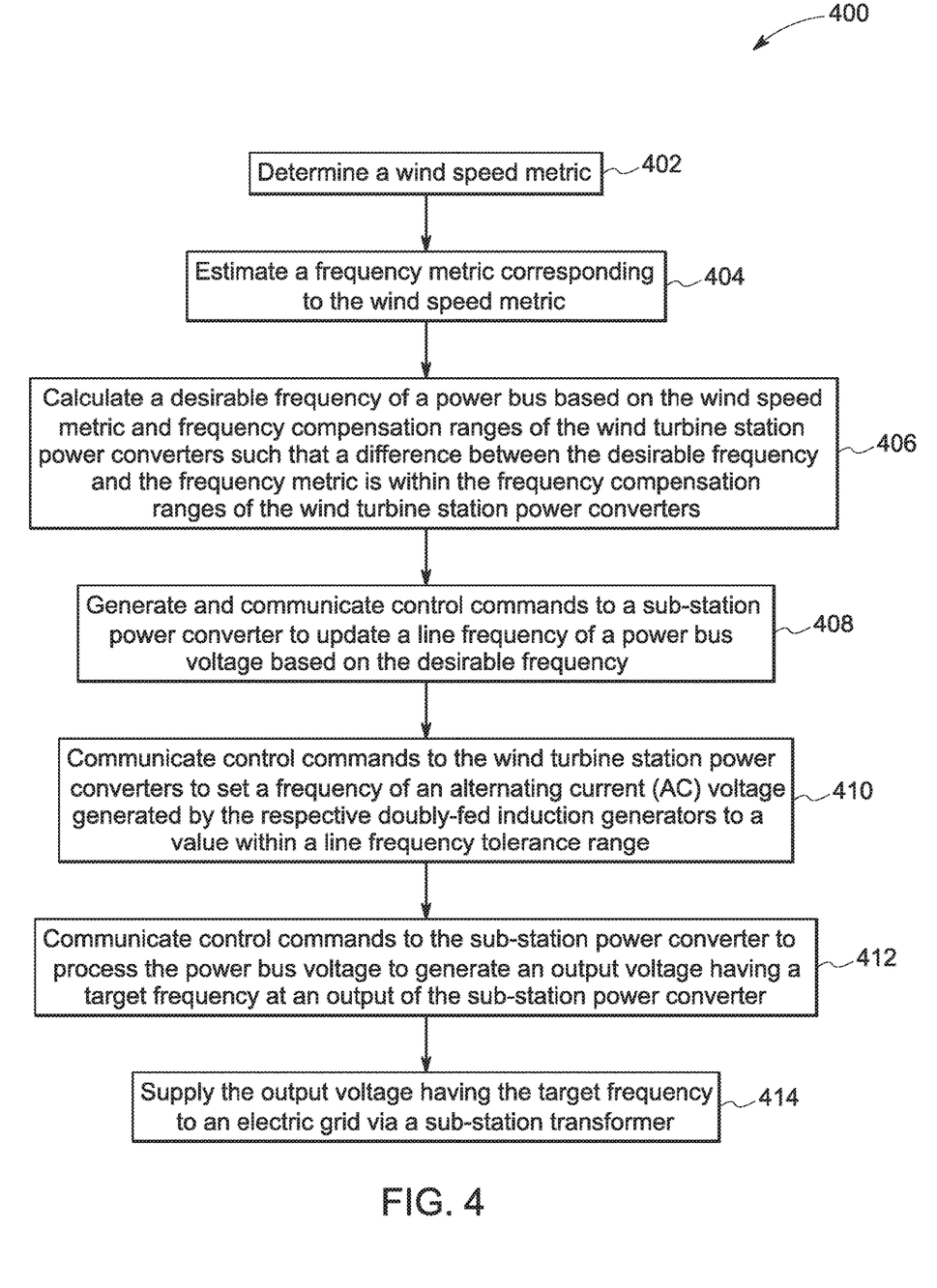
FIG. 4 is a flow diagram of an example method for operating the wind farm of FIG. 1, in accordance with aspects of the present specification.

FIG. 4 is a flow diagram 400 of an example method for operating the wind farm 102 of FIG. 1, in accordance with aspects of the present specification. FIG. 4 is described in conjunction with the components of FIG. 1. In some embodiments, the control system 114 may be employed to perform the steps of the method 400.

At step 402, a wind speed metric is determined. In one embodiment, the wind speed metric may correspond to each of the plurality of wind turbine stations 106-110. In another embodiment, the wind speed metric may correspond to the wind farm 102. Also, in some embodiments, the wind speed metric may be determined by the control system 114 based on the signals received from wind speed sensors disposed on corresponding towers 130. Further, at step 404, a frequency metric corresponding to the wind speed metric is estimated. In some embodiments, the frequency metric is estimated by the control system 114 based on one or more of the operating speed of the rotor 138, the number of poles of the rotor 138, and the number of poles of the stator 136. It may be noted that in one embodiment the control system 114 may be configured to determine a frequency metric for each wind turbine station. However, in another embodiment, the control system 114 may be configured to determine a frequency metric corresponding to the wind farm 102.

Moreover, at step 406, a desirable frequency of the power bus 150 is calculated. In certain embodiments, the desirable frequency of the power bus 150 may be calculated based on the wind speed metric estimated at step 404 and frequency compensation ranges of the wind turbine station power converters 124. More specifically, the desirable frequency of the power bus 150 may be determined such that a difference between the calculated desirable frequency and the frequency metric is within a frequency compensation range of a corresponding wind turbine station power converter 124. Furthermore, control commands may be communicated by the control system 114 to the sub-station power converter 152 for updating the line frequency of the power bus voltage, as indicated by step 408. More particularly, in response to the control commands from the control system 114, the sub-station power converter 152 is configured to update the line frequency of the power bus voltage such that the line frequency matches the desirable frequency.

Additionally, at step 410, control commands may also be communicated from the control system 114 to the wind turbine station power converters 124 of the wind turbine stations 106-110 to set a frequency of the stator voltage generated by the respective DFIGs 122 to a value within the line frequency tolerance range. In response to the control commands received from the control system 114, the wind turbine station power converters 124 of the wind turbine stations 106-110 are configured to set a frequency of the corresponding stator voltage to a value within the line frequency tolerance range. In certain embodiments, the wind turbine station power converters 124 of the wind turbine stations 106-110 are configured to set the frequency of the stator voltage to a value that is equal to the line frequency of the power bus voltage.

Also, at step 412, control commands may be communicated from the control system 114 to the sub-station power converter 152 to process the power bus voltage to generate an output voltage having a target frequency at the output 158 of the sub-station power converter 152. As previously noted, the target frequency lies within the grid frequency tolerance range. The output voltage having the target frequency may be supplied to the electric grid 104 via the sub-station transformer 154, as indicated by step 414.

Any of the foregoing steps may be suitably replaced, reordered, or removed, and additional steps may be inserted, depending on the needs of a particular application.

Various embodiments of topologies of wind farms and a method for operating these wind farms are presented. These wind farm topologies aid in reducing the overall size of the wind turbine stations. In particular, use of smaller sized wind turbine station power converters having a narrow frequency compensation range or reduced power rating allows a reduction in the footprint of the wind turbine stations. Moreover, the embodiments of the wind farms/wind turbine stations presented hereinabove circumvent the need for expensive and bulky pad-mount transformers that are typically used in the traditional wind farms. Consequently, one or more embodiments of the present specification facilitate use of transformer-less wind turbine stations. Furthermore, in some embodiments, since the sub-station power converter may be configured to generate the reactive power, available wind resources may be efficiently utilized to generate additional active power. In certain embodiments, use of the line side transformers may also be avoided, thereby further reducing the cost and overall size of the wind turbine stations. Additionally, use of the DFIGs having a corresponding wind turbine station power converter aids in improving overall annual energy production of the wind farm.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following claims.

The invention claimed is:

1. A wind farm, comprising:
   a plurality of wind turbine stations, wherein each of the plurality of wind turbine stations comprises:
   a wind turbine;
   a generator sub-system operatively coupled to the wind turbine, wherein the generator sub-system comprises:
   a doubly-fed induction generator configured to generate an alternating current (AC) voltage;
   a wind turbine station power converter electrically coupled to the doubly-fed induction generator;
   a power collection sub-system electrically coupled to the plurality of wind turbine stations, wherein the power collection sub-system comprises:
   a power bus electrically coupled to the generator sub-systems of the plurality of wind turbine stations;
   a sub-station power converter electrically coupled to the power bus;
   a control system operatively coupled to the wind turbine station power converters of the plurality of wind turbine stations and the sub-station power converter, wherein the control system is configured to:

determine a wind speed metric;
estimate a frequency metric corresponding to the wind speed metric;
calculate a desirable frequency of the power bus based on the wind speed metric and frequency compensation ranges of the wind turbine station power converters such that a difference between the desirable frequency and the frequency metric is within the frequency compensation ranges of the wind turbine station power converters; and
generate and communicate control commands to the sub-station power converter based on the desirable frequency,
wherein the sub-station power converter is configured to update a line frequency of a power bus voltage based on the desirable frequency to control power generation by the plurality of wind turbine stations.

2. The wind farm of claim 1, wherein the wind speed metric comprises an average wind speed within the wind farm, a weighted average wind speed within the wind farm, an instantaneous wind speed within the wind farm, or combinations thereof.

3. The wind farm of claim 1, wherein the frequency metric comprises a frequency of the AC voltage generated by the doubly-fed induction generator corresponding to the wind speed metric.

4. The wind farm of claim 1, wherein the control system is configured to estimate the frequency metric corresponding to the wind speed metric based on a rotational speed of a rotor of the doubly-fed induction generator and a number of poles of the rotor of the doubly-fed induction generator.

5. The wind farm of claim 1, wherein the control system is further configured to communicate control commands to the wind turbine station power converters to set a frequency of the AC voltage generated by the respective doubly-fed induction generators to a value within a line frequency tolerance range.

6. The wind farm of claim 1, wherein the control system is further configured to communicate control commands to the sub-station power converter to generate an output voltage having a target frequency at an output of the sub-station power converter based on the power bus voltage.

7. The wind farm of claim 6, wherein the target frequency has a value within a grid frequency tolerance range.

8. The wind farm of claim 1, wherein each wind turbine station power converter comprises a rotor-side converter and a line-side converter coupled to each other via a direct current (DC) link.

9. The wind farm of claim 1, wherein the generator sub-system of each of the plurality of wind turbine stations further comprises a generator electrically coupled to a corresponding wind turbine station power converter, and wherein the generator is configured to set a frequency of the AC voltage generated by a corresponding doubly-fed induction generator to a value within a line frequency tolerance range.

10. The wind farm of claim 1, wherein a stator winding of the doubly-fed induction generator is directly coupled to the power bus.

11. The wind farm of claim 1, wherein the control system is configured to:
compute a desirable value of the power bus voltage based on the wind speed metric; and
communicate control commands to the sub-station power converter for updating a magnitude of the power bus voltage to match the computed desirable value of the power bus voltage.

12. The wind farm of claim 1, wherein the plurality of wind turbine stations is classified into a plurality of wind turbine station clusters, and wherein each of the plurality of wind turbine station clusters has a corresponding power collection sub-system.

13. The wind farm of claim 12, wherein the wind speed metric comprises an average wind speed within a corresponding wind turbine station cluster, a weighted average wind speed within the corresponding wind turbine station cluster, an instantaneous wind speed within the corresponding wind turbine station cluster, or combinations thereof.

14. A method for operating a wind farm having a plurality of wind turbine stations, a control system, and a power collection sub-system electrically coupled to the plurality of wind turbine stations, wherein each of the plurality of wind turbine stations comprises a wind turbine, a generator sub-system having a doubly-fed induction generator and a wind turbine station power converter, and wherein the power collection sub-system comprises a power bus and a sub-station power converter, the method comprising:
determining a wind speed metric corresponding to the plurality of wind turbine stations;
estimating a frequency metric corresponding to the wind speed metric;
calculating a desirable frequency of the power bus based on the wind speed metric and frequency compensation ranges of the wind turbine station power converters such that a difference between the desirable frequency and the frequency metric is within the frequency compensation ranges of the wind turbine station power converters;
generating control commands based on the desirable frequency; and
communicating control commands to the sub-station power converter for updating a line frequency of a power bus voltage based on the desirable frequency.

15. The method of claim 14, further comprising communicating control commands to the wind turbine station power converters to set a frequency of an alternating current (AC) voltage generated by a respective doubly-fed induction generator to a value within a line frequency tolerance range.

16. The method of claim 14, further comprising communicating control commands to the sub-station power converter to generate an output voltage having a target frequency at an output of the sub-station power converter based on the power bus voltage.

17. The method of claim 16, further comprising supplying the output voltage having the target frequency to an electric grid via a sub-station transformer, wherein the sub-station transformer is electrically coupled between the sub-station power converter and the electric grid.

18. The method of claim 14, further comprising:
computing a desirable value of the power bus voltage based on the wind speed metric; and
communicating control commands to the sub-station power converter for updating a magnitude of the power bus voltage to match the computed desirable value of the power bus voltage.

* * * * *